US007669898B2

(12) United States Patent
Hamaguchi et al.

(10) Patent No.: US 7,669,898 B2
(45) Date of Patent: Mar. 2, 2010

(54) APPARATUS FOR DETACHING AND ATTACHING COUNTERWEIGHT

(75) Inventors: Masahiko Hamaguchi, Hirakata (JP); Akinobu Iwasaki, Hirakata (JP)

(73) Assignee: Komatsu Ltd., Tokyo (JP)

( * ) Notice: Subject to any disclaimer, the term of this patent is extended or adjusted under 35 U.S.C. 154(b) by 549 days.

(21) Appl. No.: 11/600,921

(22) Filed: Nov. 17, 2006

(65) Prior Publication Data

US 2007/0122261 A1 May 31, 2007

(30) Foreign Application Priority Data

Nov. 18, 2005 (JP) ............................ 2005-334828
Oct. 20, 2006 (JP) ............................ 2006-286510

(51) Int. Cl.
*B60S 9/00* (2006.01)

(52) U.S. Cl. ...................................................... 280/759

(58) Field of Classification Search ................. 280/755, 280/757, 759, 760, 758; 414/719
See application file for complete search history.

(56) References Cited

U.S. PATENT DOCUMENTS

| | | | | |
|---|---|---|---|---|
| 2,759,563 | A * | 8/1956 | Marnon et al. | 280/755 |
| 3,375,021 | A * | 3/1968 | Grider | 280/759 |
| 3,533,524 | A * | 10/1970 | Wilcox | 414/719 |
| 3,902,735 | A * | 9/1975 | Bertram et al. | 280/759 |
| 3,945,518 | A * | 3/1976 | Inoue | 414/719 |
| 3,963,133 | A * | 6/1976 | Gilli | 414/719 |
| 4,659,102 | A * | 4/1987 | Stuhrmann et al. | 280/481 |
| 4,664,404 | A * | 5/1987 | Schultz | 280/461.1 |
| 5,156,215 | A * | 10/1992 | Jensen | 172/611 |
| 5,833,268 | A * | 11/1998 | Aldrovandi | 280/759 |
| 7,354,066 | B2 * | 4/2008 | Yamamoto | 280/759 |

FOREIGN PATENT DOCUMENTS

| | | | |
|---|---|---|---|
| GB | 2038284 A | * | 7/1980 |
| JP | A-H07-268908 | | 10/1995 |
| JP | 08319637 A | * | 12/1996 |
| JP | A-H08-333776 | | 12/1996 |
| JP | 09078629 A | * | 3/1997 |
| JP | 10195927 A | * | 7/1998 |
| WO | WO 9703013 A1 | * | 1/1997 |

* cited by examiner

*Primary Examiner*—Paul N Dickson
*Assistant Examiner*—Laura Freedman
(74) *Attorney, Agent, or Firm*—Posz Law Group, PLC

(57) ABSTRACT

A proximal portion of a first link is pivotally supported by a rear end portion of a frame. A second support shaft is provided in a distal portion of the first link. A first cylinder and a second link to which a counterweight is connected are supported by the second support shaft. A second cylinder is connected to the second link. Through pivoting of the second link by the second cylinder, the counterweight is selectively raised and lowered between a mounting position defined on the frame and a separating position above the mounting position. Through pivoting of the first link by the first cylinder, the counterweight moves between the separating position and the ground surface.

9 Claims, 7 Drawing Sheets

APPARATUS FOR DETACHING AND ATTACHING COUNTERWEIGHT

BACKGROUND OF THE INVENTION

The present invention relates to an apparatus for detaching and attaching a counterweight provided in a construction machine such as a hydraulic excavator or a hydraulic crane, and, more specifically, to an apparatus for detaching and attaching a counterweight to and from a rear end portion of a frame.

Typically, a heavy-weighted work device such as a shovel or a crane is supported by a front portion of a frame of a construction machine such as a hydraulic excavator or a hydraulic crane. A counterweight is provided in a rear end portion of the frame in such a manner as to maintain equilibrium between the weight of the counterweight and the weight of the work device. For reducing the weight of the construction machine when transporting the machine to or out from a construction site, the counterweight is sometimes removed from the frame of the construction machine. To allow such removal, an apparatus that allows attachment and detachment of the counterweight is secured to a rear end portion of the frame. By means of the apparatus, the construction machine can be transported with the counterweight suspended from the frame. Also, the apparatus allows the counterweight to be attached to and detached from the construction machine in a state maintained on the ground surface.

Japanese Laid-Open Patent Publication No. 7-268908, for example, describes a configuration of this type of detaching/attaching apparatus. The apparatus includes a bracket secured to a rear end portion of a frame. A proximal portion of a pivotal arm is pivotally supported with respect to the bracket. A cylinder that causes pivoting of the pivotal arm is provided between the pivotal arm and the bracket. A counterweight is pivotally suspended from the pivotal arm through a connection tool at a position closer to the distal end of the pivotal arm than a connecting portion of the pivotal arm with respect to a piston rod of the cylinder. Through pivoting of the pivotal arm through the cylinder, the counterweight moves between a mounting position at the rear end portion of the frame and the ground surface.

In the apparatus, the counterweight is connected to the pivotal arm at the position closer to the distal end of the pivotal arm than the connecting portion of the pivotal arm with respect to the piston rod. Therefore, when the counterweight is raised or lowered, the torque generated by the cylinder acts on the pivotal arm at a position closer to the proximal end of the pivotal arm than the connecting portion of the pivotal arm with respect to the piston rod. This makes it necessary to employ a cylinder that generates great torque, which leads to enlargement of the apparatus. Also, the load of the counterweight acts on the pivotal arm at the position closer to the distal end of the pivotal arm than the connecting portion of the pivotal arm with respect to the piston rod. Since the pivotal arm functions as a cantilever in this case, bending load is concentrated on the distal end of the pivotal arm. Therefore, in order to enhance rigidity of a pivotal lever, the dimensions and the weight of the pivotal lever must be increased. This makes it necessary to employ a cylinder that outputs great torque.

Further, the counterweight of this apparatus is moved between the mounting position at the rear end portion of the frame and the ground surface through pivoting of the pivotal lever. Specifically, such movement of the counterweight between the rear end portion of the frame and the ground surface forms an arcuate path the radius of which corresponds to the entire length of the pivotal arm. However, the movement path of the counterweight makes it impossible to place the counterweight on the frame in a stable state or smoothly move the counterweight from the mounting surface of the frame to the ground surface. To solve the problems, it is necessary to ensure a clearance of a predetermined height between the counterweight and the frame by elevating the counterweight from the mounting surface of the frame. Nonetheless, the apparatus of this patent publication does not include a mechanism for selectively raising and lowering the counterweight with respect to the frame.

Thus, for satisfying the aforementioned necessity, the apparatus has a support pin that projects rearward from the rear end portion of the frame. An engagement hole engageable with the support pin is defined in the counterweight. Therefore, by placing the counterweight at the mounting position defined at the rear end portion of the frame and engaging the support pin of the frame with the engagement hole of the counterweight, the counterweight is suspended by the support pin. However, this structure cannot hold the counterweight stably at the rear end portion of the frame. Also, in order to bear the weight of the counterweight, the support pin and the peripheral structure around the support pin must be reinforced. This further complicates the configuration of the apparatus. Further, positioning between the engagement hole of the counterweight and the support pin is complicated.

Unlike the apparatus of Japanese Laid-Open Patent Publication No. 7-268908, an apparatus described in Japanese Laid-Open Patent Publication No. 8-333776 includes a mechanism that selectively raises and lowers a counterweight with respect to a frame. The apparatus has a bracket secured to a rear end portion of the frame. A central portion of a first arm member is pivotally supported with respect to the bracket. A first cylinder through which the first arm member is pivoted is arranged between a first end of the first arm member and the bracket. A central portion of a second arm member is pivotally supported with respect to a second end of the first arm member. A second cylinder through which the second arm member is pivoted is provided between a first end of the second arm member and the first arm member. A counterweight is pivotally suspended from a second end of the second arm member. The position of the counterweight when placed on a rear end portion of the frame is defined as a mounting position. The position of the counterweight when elevated from the mounting position through pivoting of the second arm member by the second cylinder is defined as a separating position. The counterweight is selectively raised and lowered between the mounting position at the rear end portion of the frame and the separating position above the mounting position. The counterweight moves also between the separating position and the ground surface through pivoting of the first arm member by the first cylinder.

In this apparatus, the first arm member and the second arm member are supported pivotally with respect to each other. Also, the drive cylinders are connected to the first ends of the first and second arm members and the opposing arm member or the counterweight is connected to the second ends of the arm members. Since, in this case, each of the arm members functions as a cantilever, bending load is concentrated on the distal ends of the arm members. This makes it necessary to employ cylinders that output great torque and enhance strength of each arm member. This complicates the configuration of the apparatus.

SUMMARY

Accordingly, it is an objective of the present invention to provide a simply-configured apparatus for detaching and attaching a counterweight that does not require excessive improvement of the structural strength.

A first aspect of the present invention provides an apparatus for detaching and attaching a counterweight. The detaching/attaching apparatus has a first link that is pivotally supported by a rear end portion of a frame through a first support shaft, a second link that is pivotally supported by a distal portion of the first link through a second support shaft, and a connection shaft that is selectively attached to and detached from the second link. The counterweight is supported by the second link through the connection shaft. The detaching/attaching apparatus also includes a first drive portion that is arranged between the frame and the second support shaft and a second drive portion that is provided between the first link and the second link. The counterweight is pivoted between an upper position above the frame and a lower position below the frame through pivoting of the first link by the first drive portion. Further, the counterweight is selectively raised and lowered with respect to the frame through pivoting of the second link by the second drive portion.

DETAILED DESCRIPTION OF THE PREFERRED EMBODIMENTS

A hydraulic excavator according to an embodiment of the present invention will now be described with reference to the attached drawings.

Figure 1:
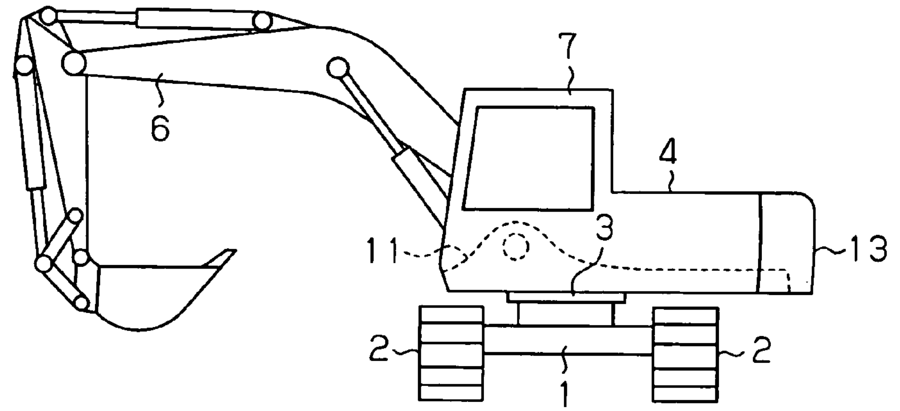
FIG. 1 is a view schematically showing a construction machine on which a detaching/attaching apparatus according to an embodiment of the present invention is mounted.

As shown in FIG. 1, the hydraulic excavator has a traveling body 1 provided in a lower portion of the hydraulic excavator. Crawler tracks 2 are rotatably provided at opposing sides of the traveling body 1. A rotating body 4 is rotatably provided above the traveling body 1 through a rotation device 3. An operator compartment 7 and a frame 11 are arranged in the rotating body 4. An engine and drive mechanisms are mounted in the frame 11. A work boom 6 is supported by the frame 11.

Figure 3:
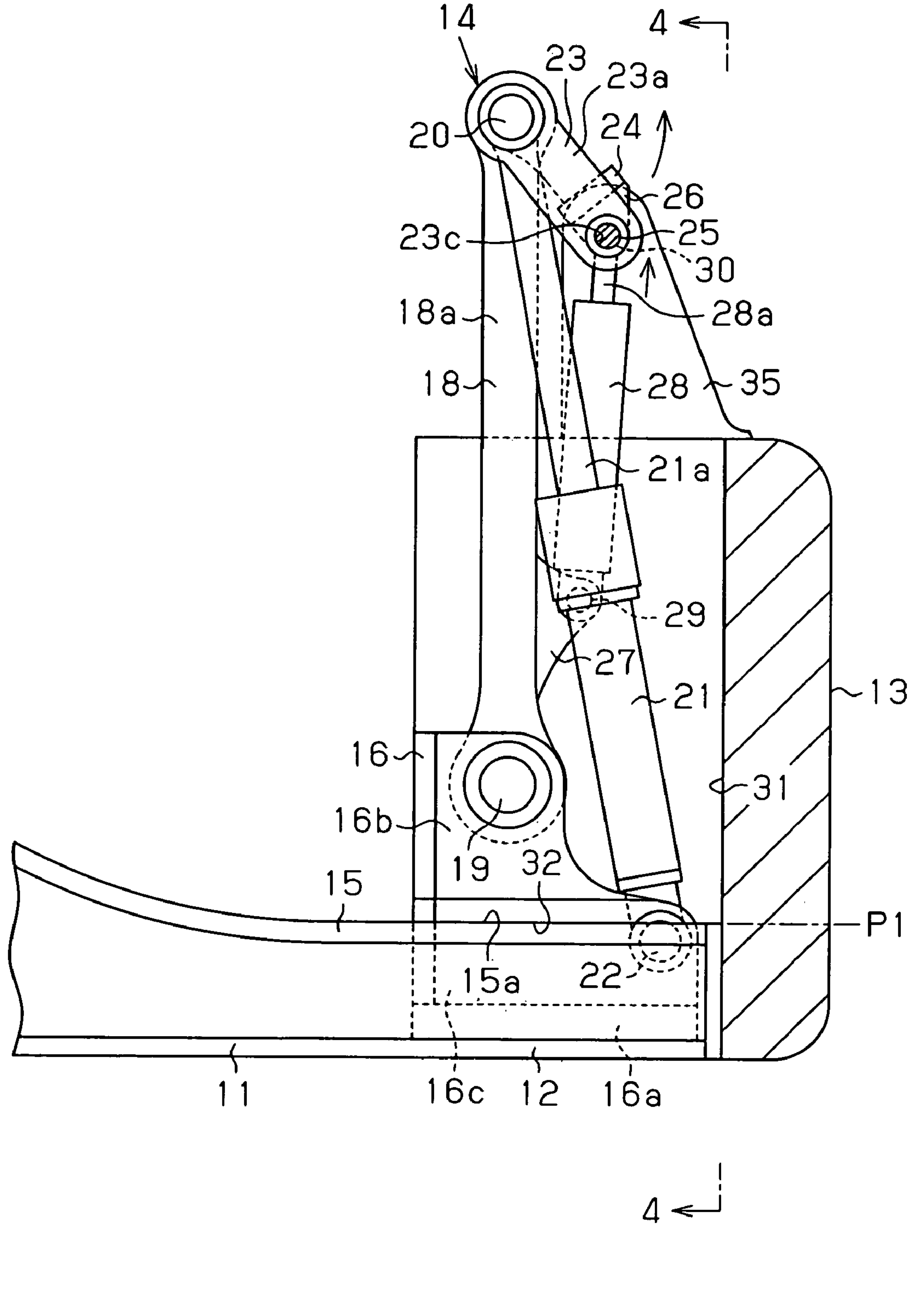
FIG. 3 is a cross-sectional view showing the detaching/attaching apparatus of the embodiment.
Figure 4:
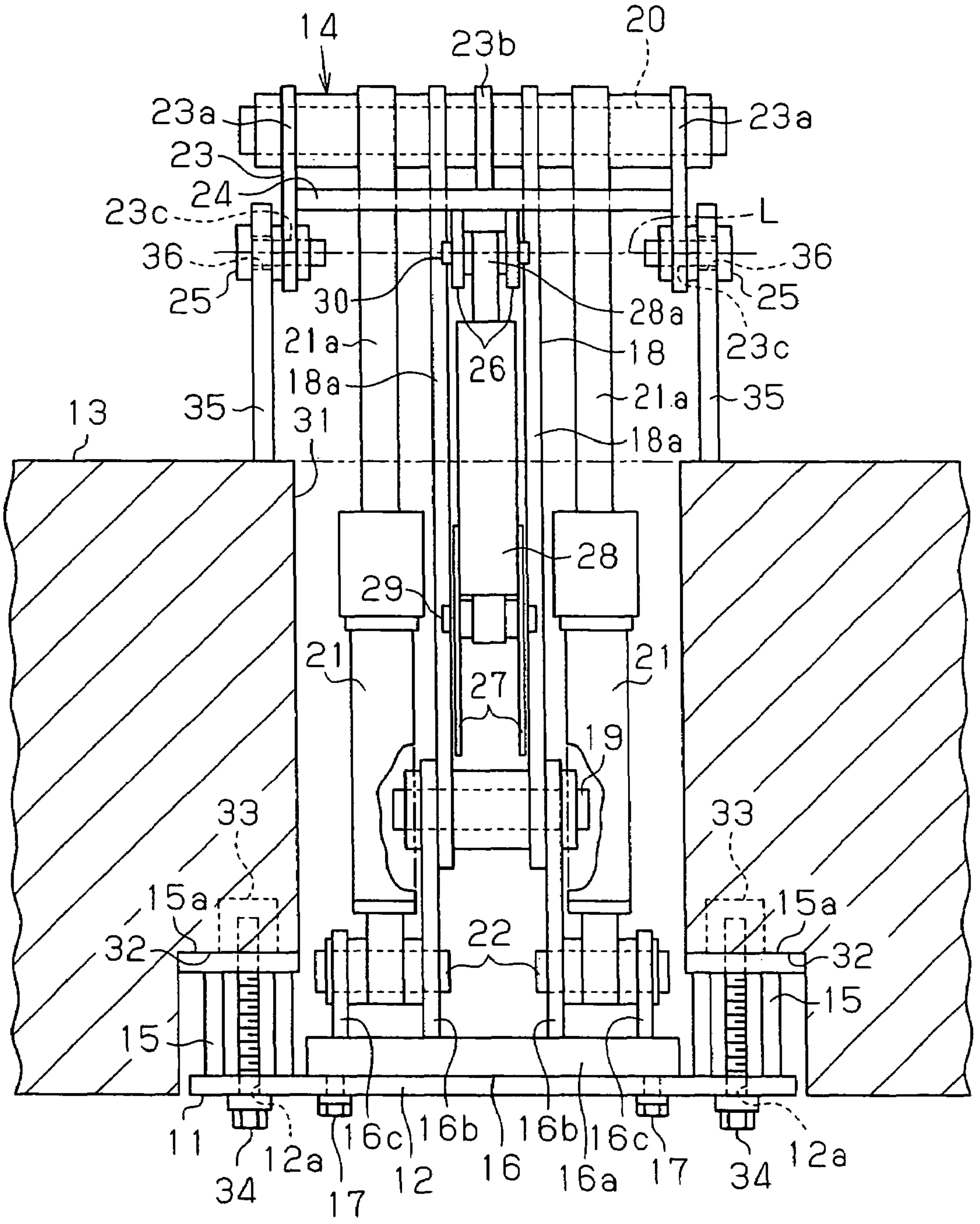
FIG. 4 is a cross-sectional view taken along line 4-4 of FIG. 3.

Referring to FIGS. 1, 3, and 4, an attachment frame 12 is provided at a rear end portion of the frame 11. A detaching/attaching apparatus 14 for a counterweight 13 is secured to the attachment frame 12. A pair of support members 15 are fixed to opposing side portions of the attachment frame 12. Each of the support members 15 has a flat top surface. The top surface of each support member 15 is a support surface **15*a* on which the counterweight 13** is mounted and held.

Figure 5:
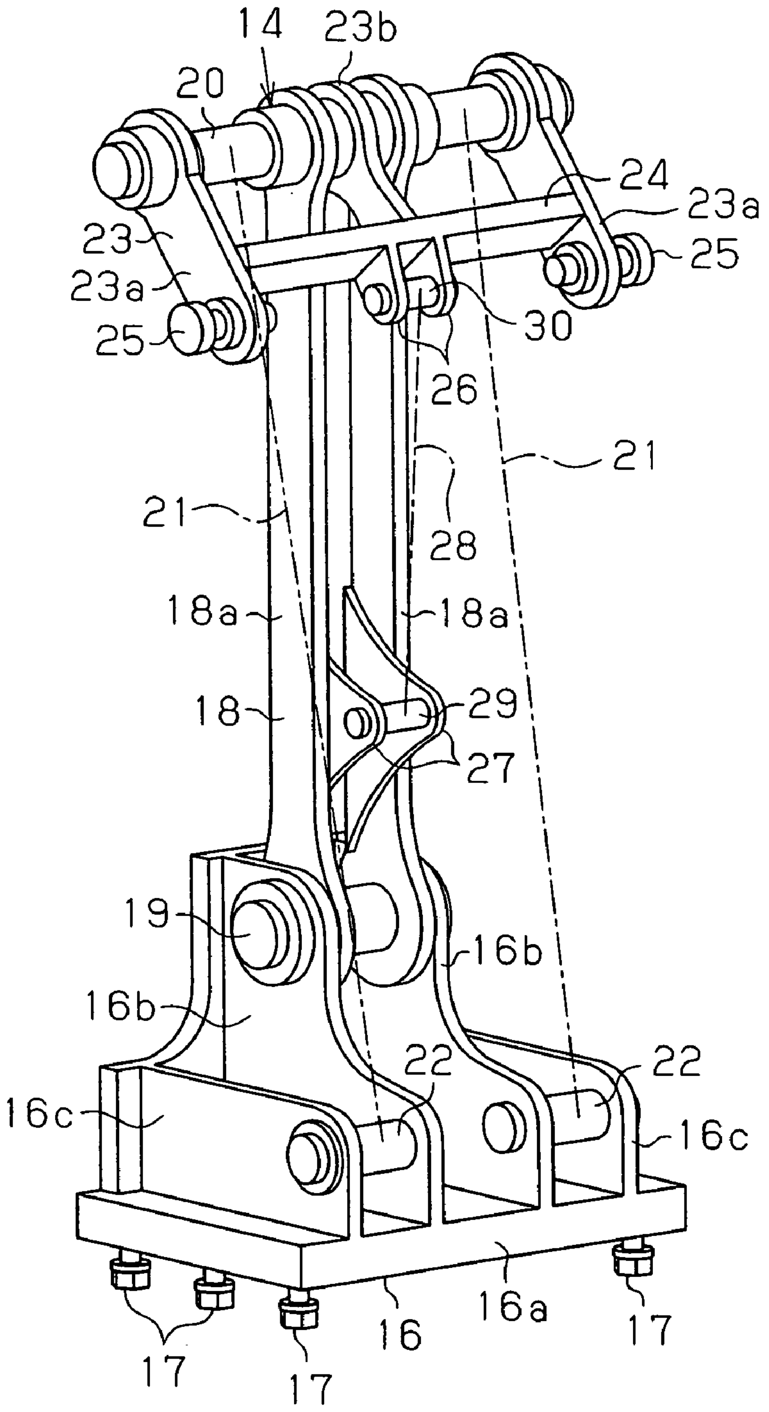
FIG. 5 is a perspective view showing the detaching/attaching apparatus of FIG. 3 with a cylinder removed from the detaching/attaching apparatus.

As shown in FIGS. 3 to 5, a bracket 16 is fixed to the detaching/attaching apparatus 14 through a plurality of bolts 17 with a bottom plate portion **16*a* of the bracket 16 held in contact with the top surface of the attachment frame 12. A pair of inner plate portions 16*b* and a pair of outer plate portions 16*c*, each of which extends in the height direction, are formed on the top surface of the bottom plate portion 16*a*. The inner and outer plate portions 16*b*, 16*c*, together with the bottom plate portion 16*a*, form the bracket 16**.

A first link 18, which is formed by a pair of link pieces **18*a*, is arranged between the inner plate portions 16*b*. A proximal portion (a lower end portion as viewed in FIG. 3) of the first link 18 is pivotally supported through a first support shaft 19 with respect to the inner plate portions 16*b*. A second support shaft 20 is connected to a distal portion (an upper end portion as viewed in FIG. 3) of the first link 18. A pair of first cylinders 21 are provided between the inner plate portions 16*b* and the opposing outer plate portion 16*c*. Each of the first cylinders 21 is formed by a hydraulic cylinder serving as a first drive portion. Each first cylinder 21 is pivotally supported through a support pin 22, which is located below and rearward from the first support shaft 19, with respect to the corresponding inner plate portion 16*b* and the associated outer plate portion 16*c*. A distal portion of a piston rod 21*a* of each first cylinder 21 is pivotally connected to a distal portion of the first link 18 through a second support shaft 20. When the piston rods 21*a* are extended from retracted into the corresponding first cylinders 21, the first link 18 pivots about the first support shaft 19**.

One end portion of a second link 23 is pivotally supported by the second support shaft 20. The second link 23 is formed by a plurality of link pieces **23*a*, 23*b*. The link pieces 23*a*, 23*b* are arranged as an integral body through a connection plate 24. Insertion holes 23*c* are provided in the other opposing end portion of the second link 23. A connection pin 25 (a connection shaft), through which the second link 23 is connected to the counterweight 13, is pivotally and removably passed through each of the insertion holes 23*c* of the second link 23. A pair of connection pieces 26, which project downward, are provided in a central portion of the connection plate 24**.

A pair of attachment pieces 27, which project rearward, are provided substantially in a central portion of the first link 18. A second cylinder 28 is arranged between the attachment pieces 27. The second cylinder 28 is formed by a hydraulic cylinder serving as a second drive portion. The second cylinder 28 is pivotally supported through a support pin 29 with respect to the attachment pieces 27. A distal portion of a piston rod **28*a* of the second cylinder 28 is pivotally connected to the second link 23 through a connection pin 30 in a state arranged between the connection pieces 26. The connection pin 30 is arranged coaxially with the connection pins 25. When the piston rod 28*a* projects from the second cylinder 28, the second link 23 pivots about the second support shaft 20**.

Figure 2:
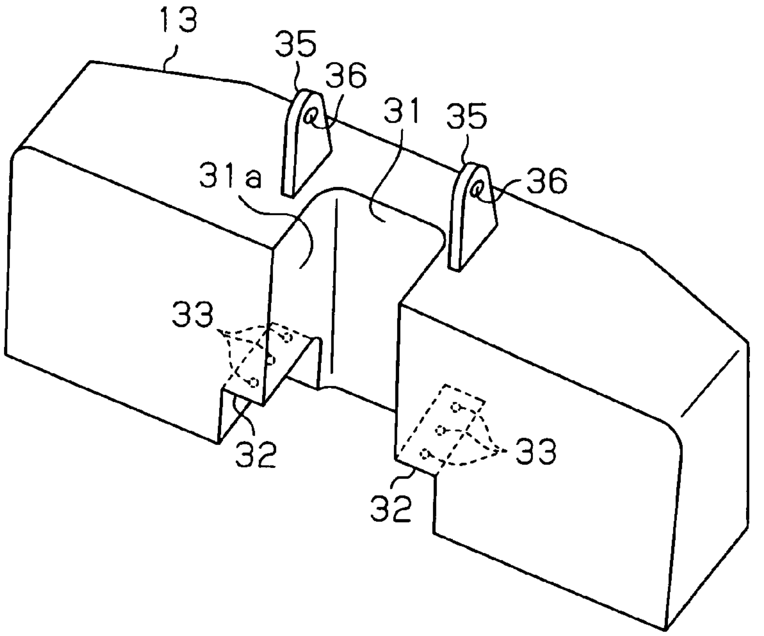
FIG. 2 is a perspective view showing a counterweight attached to and detached from the detaching/attaching apparatus of the embodiment.

Referring to FIGS. 2, 3, and 4, a recess 31 is defined at the center of the front surface of the counterweight 13 in order to avoid interference between the counterweight 13 and the detaching/attaching apparatus 14. A pair of supported surfaces 32 are provided in the vicinity of the lower end of the recess 31 and extend perpendicular to opposing side surfaces **31*a* of the recess 31. The counterweight 13 is mounted on the support members 15 of the frame 11 with the supported surfaces 32 held in contact with the support surfaces 15***a* of the frame 11. A plurality of nuts 33 are embedded in each of the supported surfaces 32 of the counterweight 13. Insertion holes 12*a* are defined in the attachment frame 12 of the frame 11 at positions corresponding to the nuts 33. With the counterweight 13 held on the support members 15, bolts 34 are passed through the insertion holes 12*a* of the attachment frame 12 and engaged with the nuts 33. This fixes the counterweight 13 to the support members 15 of the frame 11.

Figure 8:
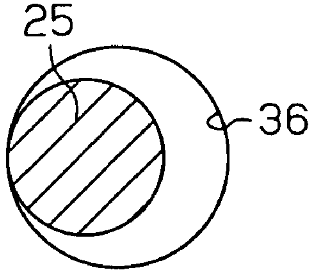
FIG. 8 is a view schematically representing the relative positions of a connection shaft and an insertion hole.

A pair of suspension plates 35, which extend upward, are fixed to the top surface of the counterweight 13. An insertion hole 36 is defined in an upper end portion of each of the suspension plates 35. With each suspension plate 35 arranged outside the second link 23, the connection pin 25 is passed through the insertion hole 36 of the suspension plate 35 and the corresponding insertion hole 23*c* of the second link 23. The counterweight 13 is thus pivotally connected to the corresponding end of the second link 23 by the suspension plates 35 and the connection pins 25. With reference to FIG. 8, the inner diameter of the insertion hole 36 of each suspension plate 35 is larger than the outer diameter of each connection pin 25. This allows the connection pins 25 to be fitted in the insertion holes 36 with a clearance defined between the inner circumferential surface of each insertion hole 36 and the corresponding connection pin 25.

Operation of the detaching/attaching apparatus 14 will hereafter be explained.

In the state illustrated in FIGS. 3 and 4, the counterweight 13 is mounted on the support surfaces 15*a* of the frame 11 at a mounting position P1. The counterweight 13 is thus fixed to the rear end portion of the frame 11 through the multiple bolts 34. Further, in this state, the piston rods 21*a* are projected from the first cylinders 21 and the piston rod 28*a* is retracted in the second cylinder 28. To move the counterweight 13 from the mounting position P1 to the ground surface E, the bolts 34 are removed from the nuts 33, thus separating the counterweight 13 from the frame 11 to which the counterweight 13 has been fixed.

Figure 6:
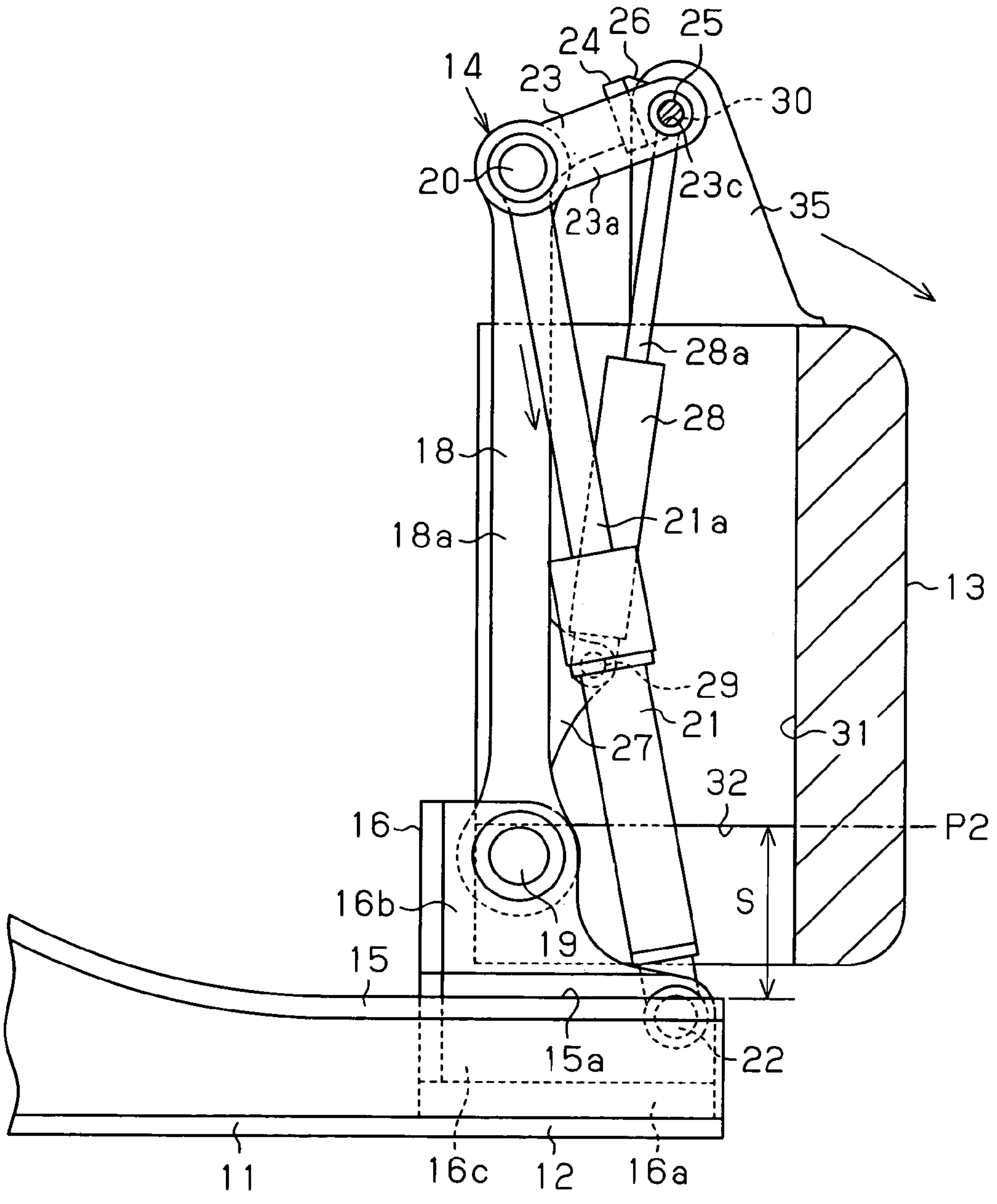
FIG. 6 is a cross-sectional view illustrating operation of the detaching/attaching apparatus.
Figure 7:
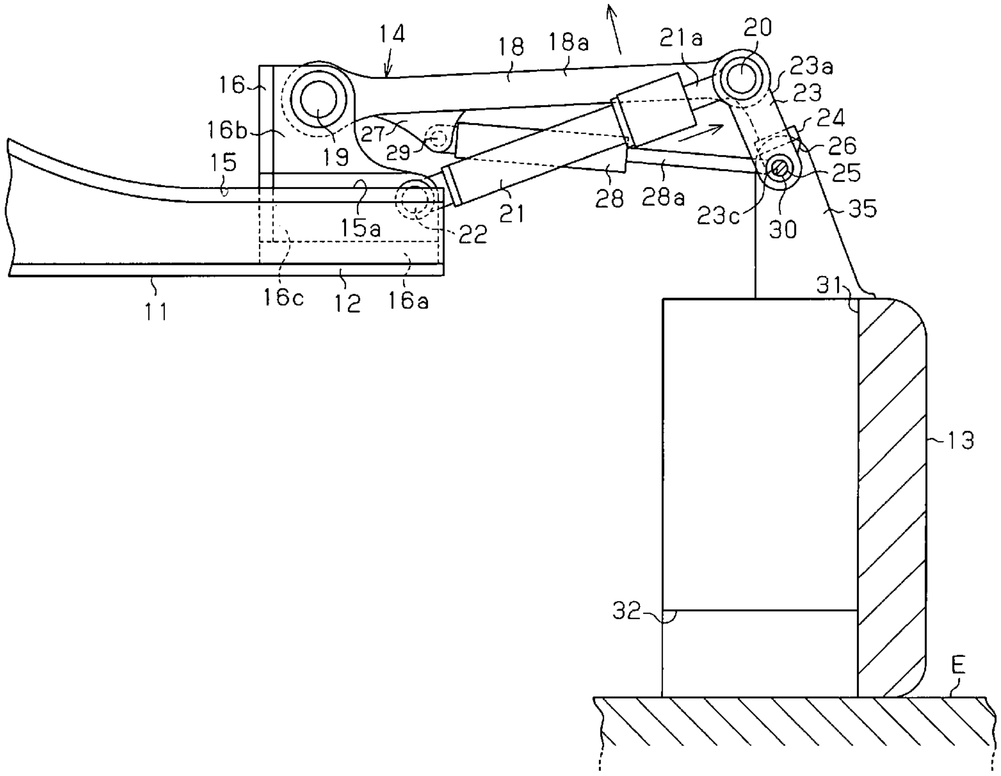
FIG. 7 is a cross-sectional view illustrating operation of the detaching/attaching apparatus.

The piston rod 28*a* then projects from the second cylinder 28, allowing the second link 23 to pivot counterclockwise about the second support shaft 20 as viewed in FIG. 3. As a result, as illustrated in FIG. 6, the counterweight 13 is sent from the mounting position P1 defined on the support surfaces 15*a* of the frame 11 to a separating position P2, which is located higher than the mounting position P1 by a distance S. Subsequently, in the state of FIG. 6, the piston rods 21*a* are retracted in the first cylinders 21, thus pivoting the first link 18 clockwise about the first support shaft 19 as viewed in FIG. 6. As a result, as illustrated in FIG. 7, the counterweight 13 is moved rearward from the separating position P2 and placed on the ground surface E. In the illustrated embodiment, the mounting position P1 and the separating position P2 each correspond to an upper position, and the ground surface E corresponds to a lower position.

Then, the connection pins 25 are removed from the insertion holes 36 of the suspension plates 35 to disconnect the counterweight 13 from the second link 23 of the detaching/attaching apparatus 14. This permits separation of the counterweight 13 from the construction machine so that the counterweight 13 can be transported to or out of the construction site, or to other destinations.

To mount the counterweight 13 on the frame 11 of the construction machine, a substantially reverse version of the above-described removal procedure of the counterweight 13 should be carried out. Specifically, as illustrated in FIG. 7, the construction machine is first arranged in front of the counterweight 13 placed on the ground surface E. The piston rods 21*a* are then retracted in the first cylinders 21, causing downward pivoting the first link 18. Each of the insertion holes 23*c* of the second link 23 and the corresponding one of the insertion holes 36 of the suspension plates 35 are thus positioned relative to each other. At this stage, by allowing the piston rods 28*a* to move freely in the second cylinders 28, free pivoting of the second link 23 is also allowed so as to facilitate positioning between the insertion holes 23*c* and the corresponding insertion holes 36. Then, the connection pins 25 are inserted into the insertion holes 36 of the suspension plates 35 and the insertion holes 23*c* of the second link 23 with the piston rods 28*a* maintained in a state projected from the second cylinders 28, thus connecting the counterweight 13 to the second link 23. In order to maintain the inserted state of the connection pins 25 in the insertion holes 23*c*, 36, split pins, for example, may be employed as the connection pins 25.

When the piston rods 21*a* project from the first cylinders 21 with the piston rod 28*a* projected from the second cylinder 28, the first link 18 pivots counterclockwise as viewed in FIG. 7. Through such pivoting of the first link 18, as illustrated in FIG. 6, the counterweight 13 is moved forward in a state elevated from the ground surface E and reaches the separating position P2 defined with respect to the frame 11. Subsequently, when the piston rod 28*a* is retracted in the second cylinder 28, the second link 23 pivots clockwise as viewed in FIG. 6. As a result, as illustrated in FIG. 3, the counterweight 13 is lowered from the separating position P2 and placed on the frame 11 at the mounting position P1. Then, as illustrated in FIG. 4, the bolts 34 are inserted into the insertion holes 12*a* of the attachment frame 12 from below and engaged with the nuts 33. The counterweight 13 is thus fixed to the support members 15 of the frame 11.

As has been described, in the illustrated embodiment, the proximal portion of the first link 18 is pivotally supported through the first support shaft 19 with respect to the detaching/attaching apparatus 14. The piston rods 21*a* of the first cylinders 21 are connected to the distal portion of the first link 18 through the second support shaft 20. The second link 23, which is connected to the counterweight 13, is supported with respect to the second support shaft 20. In this configuration, the load of the counterweight 13 and the drive force of the first cylinders 21 both act on the second support shaft 20. The first link 18 thus does not function as a cantilever. Therefore, when pivoting the first and second links 18, 23 through the first and second cylinders 21, 28 in attachment and detachment of the counterweight 13, bending load does not act on the first link 18. It is thus unnecessary to increase the size of the first link 18 or improve the structural strength of the first link 18 in order to enable the first link 18 to bear the bending load. This also makes it unnecessary to employ the cylinders 21 that output great torque, thus simplifying the structure of the detaching/attaching apparatus 14. When the second cylinder 28 is in operation, bending load acts on the link pieces 23*a* of the second link 23 and the connection plate 24. However, the link pieces 23*a* and the connection plate 24 are relatively small in size, bending of the link pieces 23*a* and the connection plate 24 does not happen easily.

Further, when the counterweight 13 is attached to or detached from the construction machine, the counterweight 13 is selectively raised and lowered between the mounting position P1 defined on the frame 11 and the separating position P2 located above the mounting position P1. The counterweight 13 is thus supported on the support surfaces 15*a* of the frame 11 in a stable state. Further, by temporarily elevating the counterweight 13 from the mounting position P1 to the separating position P2, a clearance is ensured between the counterweight 13 and the frame 11. This allows smooth movement of the counterweight 13 from the mounting position P1 defined on the frame 11 to the ground surface E. Further, unlike a conventional apparatus in which a support pin is engaged with an engagement hole and a counterweight is suspended by the support pin, the support pin and the peripheral structure around the support pin do not have to be reinforced. The configuration of the apparatus thus becomes simple, and complicated work such as positioning between the engagement hole of the counterweight and the support pin becomes unnecessary.

If there is no clearance between the connection pins 25 and the inner circumferential surfaces of the insertion holes 36, positioning between the connection pins 25 and the insertion holes 36 must be conducted accurately. Further, this arrangement involves troublesome work such as movement of the construction machine. Contrastingly, in the detaching/attaching apparatus 14 of the illustrated embodiment, the clearance is ensured between the connection pins 25 and the inner circumferential surfaces of the insertion holes 36, as shown in FIG. 8. Therefore, when connecting the second link 23 to the counterweight 13 using the connection pins 25, the second link 23 can be moved relative to the counterweight 13 in accordance with the distance corresponding to the clearance. This makes it unnecessary to accurately position the counterweight 13 relative to the construction machine. Connection of the counterweight 13 to the second link 23 through the connection pins 25 is thus facilitated.

The illustrated embodiment may be modified in the following forms.

Figure 9:
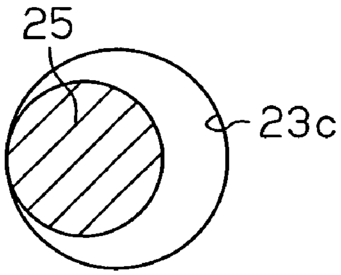
FIG. 9 is a view schematically representing the relative positions of a connection shaft and an insertion hole of a modification.

Referring to FIG. 9, to ensure a clearance between the inner circumferential surface of each insertion hole 23*c* and the corresponding connection pin 25, the diameter of each insertion hole 23*c* of the second link 23 may be greater than the outer diameter of each connection pin 25. This arrangement also permits movement of the second link 23 relative to the counterweight 13.

The insertion holes 36, 23*c*, through which the connection pins 25 are passed, may be enlarged in a lateral direction as viewed in FIG. 7.

The invention claimed is:

1. An apparatus for detaching and attaching a counterweight, comprising:

a first link pivotally supported by a rear end portion of a frame through a first support shaft;

a second link pivotally supported by a distal portion of the first link through a second support shaft;

a connection shaft that is selectively attached to and detached from the second link;

the counterweight being supported by the second link through the connection shaft;

a first drive portion arranged between the frame and the second support shaft;

a second drive portion provided between the first link and the second link;

the counterweight being pivoted between an upper position above the frame and a lower position below the frame through pivoting of the first link by the first drive portion; and the counterweight being selectively raised and lowered with respect to the frame through pivoting of the second link by the second drive portion.

2. The apparatus for detaching and attaching a counterweight according to claim 1, wherein:

a support surface is provided at the rear end portion of the frame for supporting the counterweight, the counterweight being arranged selectively at a mounting position defined on the support surface and a separating position above the mounting position through pivoting of the second link, and the counterweight being provided selectively at the separating position and the lower position through pivoting of the first link.

3. The apparatus for detaching and attaching a counterweight according to claim 2, wherein:

the first drive portion is formed by a hydraulic cylinder, a bracket being fixed to the rear end portion of the frame, a proximal portion of the first link being pivotally supported by the bracket through the first support shaft, the hydraulic cylinder being pivotally supported by the bracket through a support pin that is located below and rearward from the first support shaft.

4. The apparatus for detaching and attaching a counterweight according to claim 3, wherein:

a pair of inner plate portions and a pair of outer plate portions are formed in the frame, the proximal portion of the first link being pivotally supported through the first support shaft at a position between the inner plate portions, a pair of hydraulic cylinders being pivotally supported through the support pin at positions between the inner plate portions and the outer plate portions, and a distal portion of a piston of each of the hydraulic cylinders being pivotally connected to the second support shaft.

5. The apparatus for detaching and attaching a counterweight according to claim 2, wherein:

a plurality of nuts are provided on a supported surface of the counterweight with which the support surface of the frame is held in contact, insertion holes being defined in the frame at positions corresponding to the nuts, the counterweight being fixed to the frame by inserting bolts into the insertion holes from below and engaging the bolts with the nuts.

6. The apparatus for detaching and attaching a counterweight according to claim 1, wherein:

an insertion hole through which the connection shaft is passed is defined in the counterweight; and a clearance is provided between an inner circumferential surface of the insertion hole and the connection shaft.

7. The apparatus for detaching and attaching a counterweight according to claim 1, wherein:

an insertion hole through which the connection shaft is passed is defined in the second link; and a clearance is provided between an inner circumferential surface of the insertion hole and the connection shaft.

8. The apparatus for detaching and attaching a counterweight according to claim 1, wherein:

the second link is formed by a plurality of link pieces, the link pieces being integrated by a single connection plate.

9. The apparatus for detaching and attaching a counterweight according to claim 1, wherein:

the apparatus is mounted in a hydraulic excavator.

* * * * *